UNITED STATES PATENT OFFICE.

JACOB H. SMYSER, OF PITTSBURG, PENNSYLVANIA.

IMPROVEMENT IN LUBRICATING COMPOUNDS.

Specification forming part of Letters Patent No. 101,325, dated March 29, 1870.

*To all whom it may concern:*

Be it known that I, JACOB H. SMYSER, of Pittsburg, in the State of Pennsylvania, have invented a new and useful Improvement in the Manufacture of a Lubricating Compound or Grease for Greasing Rolls, Journals, &c.; and I do hereby declare the following to be a full, clear, and exact description of the same.

I am aware that attempts have been made to dissolve caoutchouc and then mix it with tallow, petroleum, and other substances as a lubricator. I am not aware, however, that vulcanized rubber has ever been used in a lubricating compound or grease, from the fact that it has been heretofore regarded as insoluble. Vulcanized rubber has been ground and mixed with new rubber and thus utilized, and it has been desulphurized or devulcanized and then reused; but neither of these things is involved in my invention.

My invention consists in the treatment of vulcanized rubber and petroleum by high heat and distillation in a tight receiver, and using the product of the distillation for dissolving the vulcanized rubber, which it will do, and after this compound is sufficiently cool mixing with it tallow, by preference, or other grease or oil, for making a lubricating compound.

In carrying out my process I use waste vulcanized rubber, because it is very cheap, very abundant, and scarcely ever reused, and because it contains sulphur, white lead, and possibly other constituents which are essential to the manufacture of the lubricator in question. Old or worn-out car-springs, which usually are thrown away and regarded as of no value, I find to possess the very constituents that I want to carry out my process. If I used new or unprepared rubber, I would be compelled to use sulphur or its equivalent, and possibly the white lead and the other material used in vulcanized rubber; but finding exactly what I want in worn-out or what is termed "waste" vulcanized rubber, and it commanding but a very low price, I mention it as the element of my composition.

To prepare my lubricating compound I proceed as follows: I first prepare a receiver of suitable strength and capacity, which is set over a proper furnace, where a high heat can be attained. Into this receiver I charge a quantity of vulcanized rubber and about fifty per cent., by weight, of petroleum, (heavy petroleum, as being more safe than the lighter hydrocarbons.) The receiver is then subjected to a high degree of heat after it has been properly closed up, and the distillation of the vulcanized rubber and petroleum commences. The vapor driven over and condensed is returned to the receiver and there mixes with its contents, and this product of distillation, under the high temperature, dissolves the vulcanized rubber, and it and the petroleum and their vapors thoroughly mix into a pasty mass. Precisely what the product of distillation from caoutchouc, sulphur, white lead, and other material used for vulcanizing rubber and the petroleum may be called I do not pretend to exactly know. It is very pungent, volatile, and of disagreeable odor—possibly a sulphide of carbon. Whatever it is, it thoroughly dissolves the vulcanized rubber, and it and the petroleum go into a pasty mass, and may be called "sulphide of carbon and caoutchoucin."

In carrying out the process of distillation I at first carried over the vapors arising from the material in the receiver into a condenser, and then reconveyed that liquid back into the receiver again; but I found by further experiment that by using a receiver of considerable size or height the vapor arising from the mixture would condense on the top of the receiver and fall back in a liquid state into the rubber and petroleum mixture, and thus answer every purpose, while it dispensed with a separate condensing apparatus. After the vulcanized rubber and the petroleum have become thoroughly mixed and the rubber thoroughly dissolved, it is mixed with about an equal weight of tallow, which makes the lubricating compound. The tallow should be first highly heated, so as to drive off all the moisture in the shape of water in it. Otherwise, if mixed with the highly-heated paste-mixture, it might cause an explosion in the tight receiver; but when the tallow is thoroughly dried it can be and is mixed with perfect safety with the hot pasty substance that is the product of the rubber and petroleum distillation, and this mixture so prepared constitutes the lubricator or grease which I have discovered.

In one hundred pounds of this lubricating material there are used about thirty-three pounds of vulcanized rubber, seventeen pounds of petroleum, and, say, fifty pounds of tallow.

I do not, of course, confine myself to these exact proportions, but find them to answer a good purpose and make a good product. Without the use of the oil or liquid distilled from the vulcanized rubber and petroleum the rubber could not be thoroughly dissolved, and unless the rubber be thoroughly dissolved the lubricator or grease is not good. The sulphur in the vulcanized rubber seems to be an indispensable thing in the production of the liquid which so thoroughly dissolves the rubber. If the sulphur were not in the rubber, it or its equivalent in some form would have to be added.

Having thus fully described my invention, what I claim therein as new, and desire to secure by Letters Patent, is—

A lubricator or grease made of vulcanized rubber and petroleum, which is distilled and mixed with the products of its distillation and with tallow or other grease or oil, substantially as herein described.

JACOB H. SMYSER.

Witnesses:
    FRED. S. SWETT,
    SAML. PRESTLEY.